(No Model.)

W. YOUNG.
HEDGE FENCE.

No. 317,606. Patented May 12, 1885.

WITNESSES
Chas. R. Burr
Fred F. Church.

INVENTOR
Wesley Young
By Church & Church
His Attorneys

UNITED STATES PATENT OFFICE.

WESLEY YOUNG, OF DAYTON, OHIO.

HEDGE FENCE.

SPECIFICATION forming part of Letters Patent No. 317,606, dated May 12, 1885.

Application filed May 23, 1884. (No model.)

*To all whom it may concern:*

Be it known that I, WESLEY YOUNG, of the city of Dayton, in the county of Montgomery and State of Ohio, have invented certain new and useful Improvements in Hedge Fences; and I do hereby declare the following to be a full, clear, and exact description of the same, reference being had to the accompanying drawings, forming a part of this specification, and to the figures and letters of reference marked thereon.

My invention relates to that class of hedge fences in which the plants are bent down in the plane of the fence and there secured by means of wires or equivalent fastenings applied thereto; and it consists, first, in the combination, with the bent plants, of one or more lines of crimped wires and staples or other equivalent fastening devices for securing the bent plants to said wires, whereby the plants are maintained at the proper distances apart, and are prevented from slipping along the lines of wire under their natural tendency to spring back into vertical position, and whereby, also, the injurious effects of expansion and contraction of the wires are in a very considerable degree overcome; and it consists, secondly, in constructing the fence in sections, which are firmly anchored or secured to each other in such manner as to prevent the contraction or expansion of the fastening-wires of one section from interfering with the independent contraction or expansion of the wires of another section, and thus tend to produce a fence whose plants are all inclined at substantially the same angle, and stand at substantially the same height, all as will be hereinafter fully described and claimed.

Figure 1:
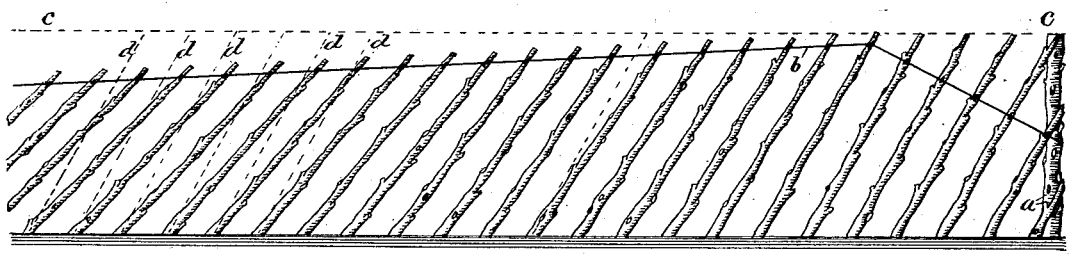
Figure 3:
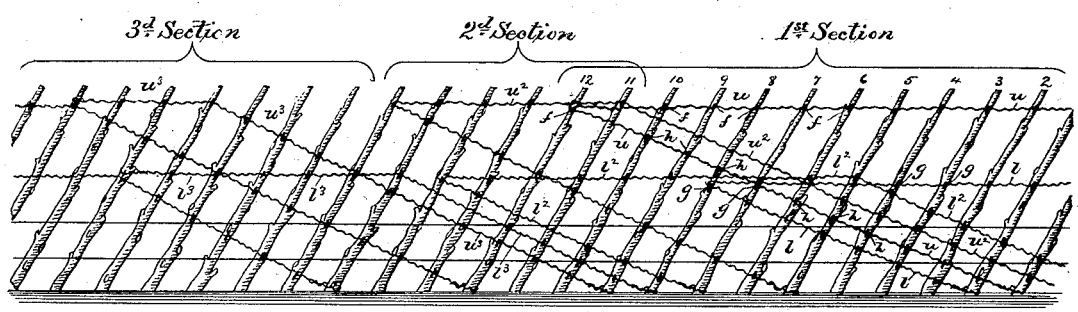
Figure 2:
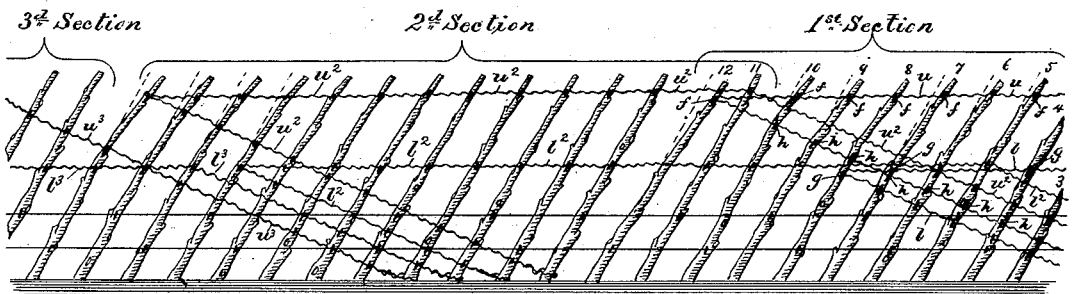

In the accompanying drawings, Figure 1 represents a view of an old form of hedge fence; Figs. 2 and 3, views of improved sectional fences constructed in accordance with my invention.

Similar letters of reference in the several figures indicate like parts.

In the construction of hedge fences as ordinarily practiced a stake or post is usually firmly fixed in the ground at the head of the row of plants to be made into the fence, and to this stake or post is firmly secured the line-wire to which the plants are to be fastened. This being done, the plants are bent down one by one into the proper inclined position, and are each secured to the line-wire by means of one or more staples driven into them astride said line-wire. This plan of operations is continued till the fence is completed. While at first apparently substantial and regular, a fence thus constructed develops in the course of time serious defects. In the first place, owing to the constant tendency of the plants to rise up into their original vertical positions, the bite of the staples upon the line-wire is oftentimes insufficient to prevent the plants from shifting their position along the line-wire, thus not only destroying the regularity of the intervals or spaces between the plants, and permitting small animals to pass through, but causing the displaced plants to project above the tops of the other plants, and thus give the top of the fence a ragged unsightly appearance. This difficulty I have completely overcome by the employment of crimped line-wires, the result being a new combination of wire, plants, and staples, whereby the staples driven into the plants astride the crimped wire are caused to engage positively with the crimps, and prevent the possibility of the slipping of the plants along the wire under their tendency to rise up into vertical position, however strong that tendency may be. Another and perhaps more serious difficulty is, however, experienced with the ordinary hedge fence I have referred to, due to the contraction and expansion of the line-wires under variations in the temperature. From the fact that the line-wire is anchored rigidly only at the beginning of the fence, it follows that when said wire becomes contracted or shortened there will be a tendency in the whole row of plants to incline toward such anchored end, the plants most remote from such end being, of course, the most affected and inclined to a greater degree than those nearer said end. This is well illustrated by Fig. 1. At the extreme right is shown the rigid post or stake *a* with the line-wire *b* secured to it. The dotted line *c c* indicates the top line of the fence when first built, and the dotted lines *d d* indicate the angle at which the plants most remote from the post *a* originally stood, while the full lines show how, through the contraction of the line-wire, the angles of the said remote plants have been increased, and also how the top of the fence has been lowered below the original horizontal line.

Though the use of crimped wire has to some extent obviated the evils of expansion and contraction, it has not by any means been alone sufficient, and I have therefore devised a plan of constructing the fence in sections, which, from practical test, has been found to be entirely effective.

In carrying out my said plan of construction a stake or post is first driven at the head of the row of standing plants, as formerly, and then, after fastening the line-wires to the said stake or post, the plants are successively bent down and secured by staples, as before described, till a section of from four to ten rods of fence is made, depending upon the size and character of the plants, the nature of the soil, &c. At the right of Fig. 2 is represented the end of a fence-section thus formed, the plants numbered from 3 to 12 representing the last plants of the section. It will be noticed that the upper horizontal line-wire, $u$, is stapled at $f$ to each of the plants save the next to the last plant, numbered 11, while the lower line-wire, $l$, which terminates its horizontal course at the plant numbered 8, is stapled at $g$ to each of the plants which it passes, save the plants numbered 5 and 6. It will also be observed that after the upper line-wire, $u$, has finished its horizontal course it is carried back diagonally across a number of the preceding plants of the section end, and is stapled at the points $h$ to all of those which it crosses, except the plant 11, which was omitted in stapling its horizontal portion, while the lower line-wire is also carried back diagonally in a similar manner, though stapled to all of the plants which it crosses. This disposition of the ends of the line-wires completes the end of the section, and the section itself is so short that the further bending of the plants toward its first or fixed end, due to the contraction of the wires, is so slight as to be practically unobservable, the shortening of the wires being in fact almost entirely compensated for by the use of the crimped wire.

In the construction of the next section, in further continuation of the fence, it is of course necessary to anchor its beginning as firmly and securely as was the beginning of the first section, and in such a manner, too, that even the slight play of the last plants of the first section will not be communicated to the second section. The upper line-wire, $u^2$, of the second section is therefore first lapped over the last end of the first section, and secured to the stouter and more unyielding portions of the plants 3 to 6, inclusive, for instance, and then, passing the upper and more flexible portions of the plants 7 to 10, inclusive, is stapled securely to the upper portion of the plant 11, proceeding thence horizontally, and having stapled to it the plants composing the second section. In like manner the lower line-wire, $l^2$, of the second section is secured to the lower stout portions of the plants 3 to 6, inclusive, passes by the plants 7 to 9, inclusive, is stapled to the plants 10 and 11, passes the plant 12, and, continuing in a horizontal direction, has secured to it in order the plants of the second section.

It will be observed that both the upper and lower line-wires of the second section are anchored, primarily, to the lower stout portions of the plants of the first section, or, in other words, at points upon said plants where the latter are capable of resisting the greatest strain; furthermore, that the stapling, especially the horizontal portions of the said line-wires of the second section, occurs only at such points as will prevent the horizontal draft of the wires of the second section from opposing the similar draft of the wires of the first section. For instance, while the horizontal portion of the upper wire, $u$, of the first section passes by the plant 11, and is stapled to plant 12, the upper wire, $u^2$, of the second section, on the contrary, passes by the plant 12, and is stapled to the plant 11, from which it results that while the plant 12 and the plants preceding plant 10 are permitted to respond to any contraction of the line-wire $u$ and lean, if necessary, more to the fixed end of the first section, the plant 11, because of its being disconnected at the top, does not so respond, but remains perfectly stationary, being anchored on the one hand by the diagonal extension of the wire $u^2$ of the second section, and subjected to the draft of the second section of plants on the other hand. The same is true of the lower line-wires—that is to say, the plants 5 and 6, to which the wire $l$ of the first section is not connected, are selected, because of their independence, for the connection of the wire $l^2$ of the second section. It follows, therefore, that while all the plants of the first section, except the upper portion of plant 11 and the middle portion of plants 5 and 6, are permitted to respond to the contraction of the wires $u$ and $l$, and tend toward the beginning or fixed end of the first section, the upper end of said plant 11 and the middles of the plants 5, 6, 10, and 11 are held firm by the upper and lower wires, $u^2 l^2$, of the second section, and form a rigid base or anchorage, to which the whole second section inclines to its limited extent when its line-wires are in turn subjected to contraction.

A fence thus built of separate sections connected together, though practically independent of each other so far as contraction and expansion are concerned, combines the advantages of neatness, compactness, regularity, and strength, and is believed to be a marked improvement on previous constructions.

At the last end of the second section shown in Fig. 2 the line-wires $u^2 l^2$ are shown running backward and anchored in substantially the same manner as the last ends of the line-wires are arranged in the first section. At the beginning of the third section, however, the first ends of the upper and lower wires, $u^3 l^3$, are not made to overlap or cross the corresponding wires, $u^2 l^2$, of the second section; but the result, as will be seen, is substantially the same, the independence of the adjacent sections being preserved.

Fig. 3 represents constructions substantially the same as shown in Fig. 2, the difference being that the middle or second section is shortened up in order that more of the third section may be exhibited.

I am aware that crimped wire has been before used for the line-wires of an ordinary wire fence in which the wires are secured by suitable means to rigid posts; but the crimps in the wire in such a fence do not serve any useful purpose save to allow of contraction and expansion of the wires.

While it is true that this same property of crimped wire is availed of in the construction of my hedge fence, it is also true that it there rather figures as an incident to the use of the wire for another and different purpose than as a property which, because peculiar to crimped wire, rendered the selection of the latter necessary.

I obviously do not and could not claim, abstractly, the right to use crimped wire as a fencing material, because I recognize its availability for that purpose to be already well known. I simply employ it as an old element in a new combination—namely, a combination of bent flexible plants, crimped wire, and staples or equivalent fastening means. In this new combination the crimped wire and staples perform a function they cannot perform in any ordinary fence—to wit, the keeping of the plants the proper relative distances apart, and the prevention of their tendency to rise up into vertical position, and this for the simple reason that the conditions recited do not and cannot exist in a fence of ordinary construction where the wires are fastened to fixed posts alone.

I therefore claim as my invention—

1. A hedge fence consisting, essentially, of flexible plants bent down in the plane of the fence, crimped line-wires to which the said bent plants are secured, and means—such as staples—for firmly securing the plants to the crimped wires, and preventing the rising of the plants as well as a change of their relative positions, substantially as described.

2. A hedge fence constructed of sections which are each composed of a series of plants bent down and secured to suitable line-wires, the line-wires of each succeeding section being anchored at one end to the inflexible portions of some of the plants of the next preceding section, and terminating at the other end within the section whose plants it secures, whereby each section is enabled to conform to the contraction and expansion of its own line-wires without being affected by the contraction and expansion of the line-wires of the other sections, substantially as described.

WESLEY YOUNG.

Witnesses:
WM. H. YOUNG,
GEO. R. YOUNG.